(12) United States Patent
Cohen

(10) Patent No.: US 7,627,638 B1
(45) Date of Patent: Dec. 1, 2009

(54) VERBAL LABELS FOR ELECTRONIC MESSAGES

(75) Inventor: Michael H. Cohen, Portola Valley, CA (US)

(73) Assignee: Google Inc., Mountain View, CA (US)

( * ) Notice: Subject to any disclaimer, the term of this patent is extended or adjusted under 35 U.S.C. 154(b) by 655 days.

(21) Appl. No.: 11/019,431

(22) Filed: Dec. 20, 2004

(51) Int. Cl.
  *G06F 15/16* (2006.01)
(52) U.S. Cl. ...................................... 709/206
(58) Field of Classification Search ................ 709/204, 709/206
  See application file for complete search history.

(56) References Cited

U.S. PATENT DOCUMENTS

| | | | | |
|---|---|---|---|---|
| 4,757,525 A | * | 7/1988 | Matthews et al. | 379/88.26 |
| 5,915,001 A | * | 6/1999 | Uppaluru | 379/88.22 |
| 6,029,164 A | * | 2/2000 | Birrell et al. | 707/3 |
| 6,185,535 B1 | | 2/2001 | Hedin et al. | 704/270 |
| 6,269,336 B1 | | 7/2001 | Ladd et al. | 704/270 |
| 6,349,132 B1 | * | 2/2002 | Wesemann et al. | 379/88.17 |
| 6,385,583 B1 | | 5/2002 | Ladd et al. | 704/270 |
| 6,400,806 B1 | | 6/2002 | Uppaluru | 379/88.22 |
| 6,493,671 B1 | | 12/2002 | Ladd et al. | 704/270 |
| 6,519,479 B1 | | 2/2003 | Garudadri et al. | 455/563 |
| 6,532,230 B1 | * | 3/2003 | Lung et al. | 370/352 |
| 6,788,929 B2 | * | 9/2004 | Hymel | 455/412.2 |

OTHER PUBLICATIONS

Kai, A., et al., "Comparison of Continuous Speech Recognition Systems with Unknown-Word Processing for Speech Disfluencies," Scripta Technica, Syst Comp. Jpn, 29(9): 43-53, 1998, abstract only.
Knowlton, J., "Speech Recognition is one to watch," Business@Home: Round the Block, http://www.gohome.com/departments/round-the-block/199905-round.html, May 1999.
Patch, K., et al., "Speech Command and Control," http://www.scriven.com/rsi/rsidata/kimsmacros/kims_macros_talk.html, Mar. 2002.

(Continued)

*Primary Examiner*—Jeffrey Pwu
*Assistant Examiner*—Farhad Ali
(74) *Attorney, Agent, or Firm*—Morgan, Lewis & Bockius LLP

(57) ABSTRACT

Verbal labels for electronic messages, as well as systems and methods for making and using such labels, are disclosed. A verbal label is a label containing audio data (such as a digital audio file of a user's voice and/or a speaker template thereof) that is associated with one or more electronic messages. Verbal labels permit a user to more efficiently manipulate e-mail and other electronic messages by voice. For example, a user can add such labels verbally to an e-mail or to a group of e-mails, thereby permitting these messages to be sorted and retrieved more easily.

26 Claims, 10 Drawing Sheets

OTHER PUBLICATIONS

Salvi, G., "Developing Acoustic Models for Automatic Speech Recognition in Swedish," European Student Journal of Language and Speech, Stockholm, Sweden, Jun. 28, 1999.

Vanhoucke, V., et al., "Speaker-Trained Recognition Using Allophonic Enrollment Models," ASRU 2001, Madonna di Campiglio Trento, Italy, Dec. 9-13, 2001.

"AT&T Watson Speech Recognition," http://speech.cs.cmu.edu/comp.speech/section6/recognition/att.html, Nov. 2004.

"Microsoft Speech Application SDK," http://msdn.microsoft.com/library/en-us/sasdk_usermanual/html/um_gets_enablingIntro..., Oct. 2004.

"Nuance Grammar Products and Services," Nuance Communications Inc., 2001.

"Speech Based Dictionary Editing," Sprex Inc., Nov. 1, 2004.

"Garbage Modeling," Sprex Inc., Nov. 1, 2004.

* cited by examiner

VERBAL LABELS FOR ELECTRONIC MESSAGES

RELATED APPLICATIONS

This application is related to U.S. patent application Ser. No. 10/816,428, filed Mar. 31, 2004, entitled "Displaying Conversations Relevant to a Search Query in a Conversation-Based E-mail System," which application is incorporated by reference herein in its entirety.

TECHNICAL FIELD

The disclosed embodiments relate generally to electronic messages. More particularly, the disclosed embodiments relate to verbal labels for electronic messages, as well as methods and systems to make and use such labels.

BACKGROUND

Every day, people send and receive millions of electronic messages, such as e-mail, over computer networks for business and leisure. Indeed, e-mail (also written as "email") has become an extremely popular communication channel for people to exchange information.

There are times when users want to listen to e-mail or other electronic-messages, rather than view them (e.g., while driving). Accessing e-mail during such times requires speech recognition to navigate the e-mail list verbally, as well text-to-speech synthesis to read out the e-mail to the user.

Unfortunately, present "e-mail by voice" systems permit very few actions to be performed on e-mail messages besides listening to them. Thus, it would be highly desirable to more efficiently manipulate e-mail and other electronic messages by voice.

SUMMARY

The present invention overcomes the limitations and disadvantages described above by providing a verbal label for electronic messages, as well as methods and systems to make and use verbal labels. A verbal label is a label containing audio data (such as a digital audio file of a user's voice and/or a speaker template thereof) that is associated with one or more electronic messages.

Verbal labels permit a user to more efficiently manipulate e-mail and other electronic messages by voice. For example, a user can add such labels verbally to an e-mail or to a group of e-mails, thereby permitting these messages to be sorted and retrieved more easily.

In some embodiments, verbal labels can be searched by voice or text input. In some embodiments, verbal labels can be unified with text labels. For example, if a user at a desktop computer attached the text label "marketing meeting" to some e-mails, and then, while driving, attached the verbal label "marketing meeting" to some other e-mails, a messaging system with verbal labels would recognize that both sets of e-mails have the same label.

Thus, verbal labels enhance the functionality of verbal interfaces to electronic messages.

BRIEF DESCRIPTION OF THE DRAWINGS

For a better understanding of the aforementioned aspect of the invention as well as additional aspects and embodiments thereof, reference should be made to the Description of Embodiments below, in conjunction with the following drawings in which like reference numerals refer to corresponding parts throughout the figures.

DESCRIPTION OF EMBODIMENTS

Verbal labels for electronic messages, as well as systems and methods for making and using such labels, are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth to provide a thorough understanding of the present invention. However, it will be apparent to one of ordinary skill in the art that the invention may be practiced without these particular details. In other instances, methods, procedures, components, networks, and speech recognition techniques that are well-known to those of ordinary skill in the art are not described in detail to avoid obscuring aspects of the present invention.

Figure 1:
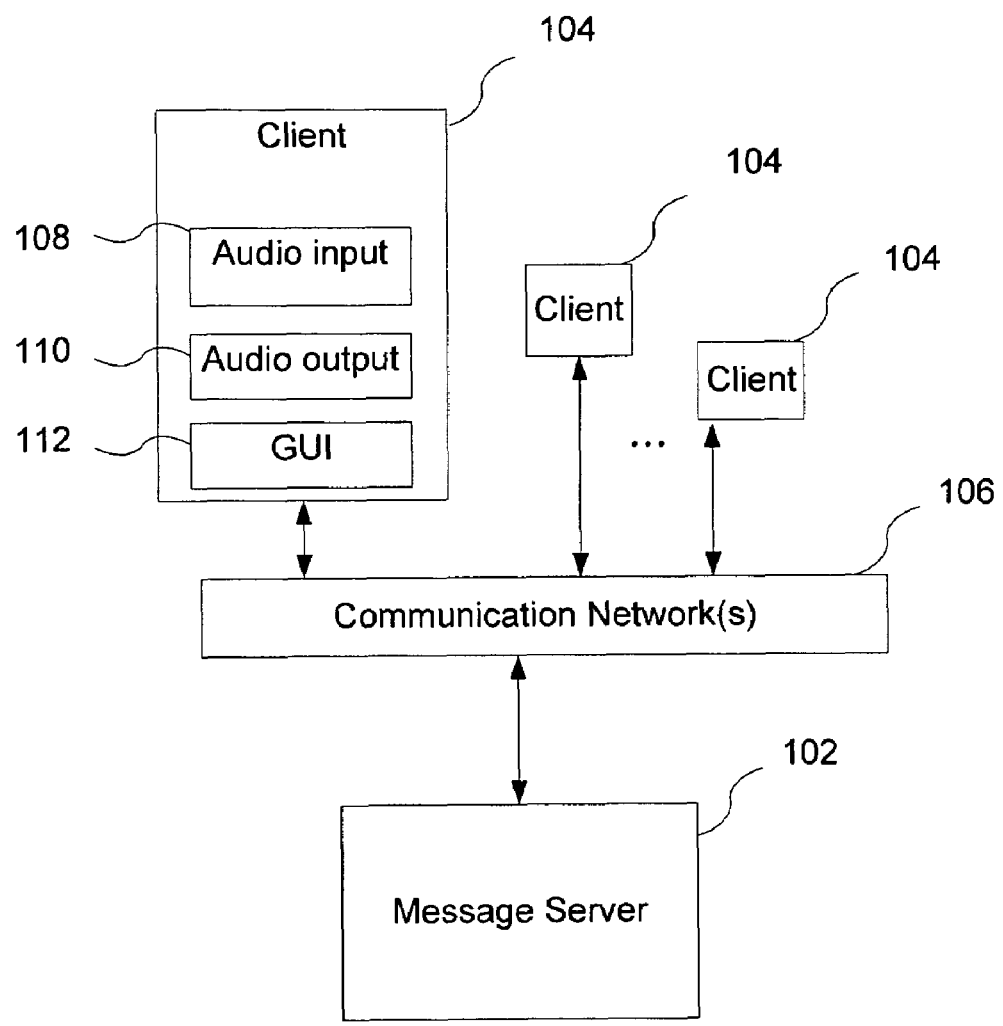
FIG. 1 is a block diagram illustrating an exemplary distributed computer system according to one embodiment of the invention.

FIG. 1 is a block diagram illustrating an exemplary distributed computer system according to one embodiment of the invention. This system includes a plurality of client computers 104, message server 102, and communication network(s) 106 for interconnecting these components. Client 104 includes audio input 108 (e.g., a microphone) and audio output 110 (e.g., a speaker). Client 104 may optionally include a graphical user interface 112, such as a display device, a keyboard, and a mouse or other pointing device. Exemplary clients 104 include, without limitation, cell phones, wireline phones, wireless computers, and wireline computers.

Figure 2:
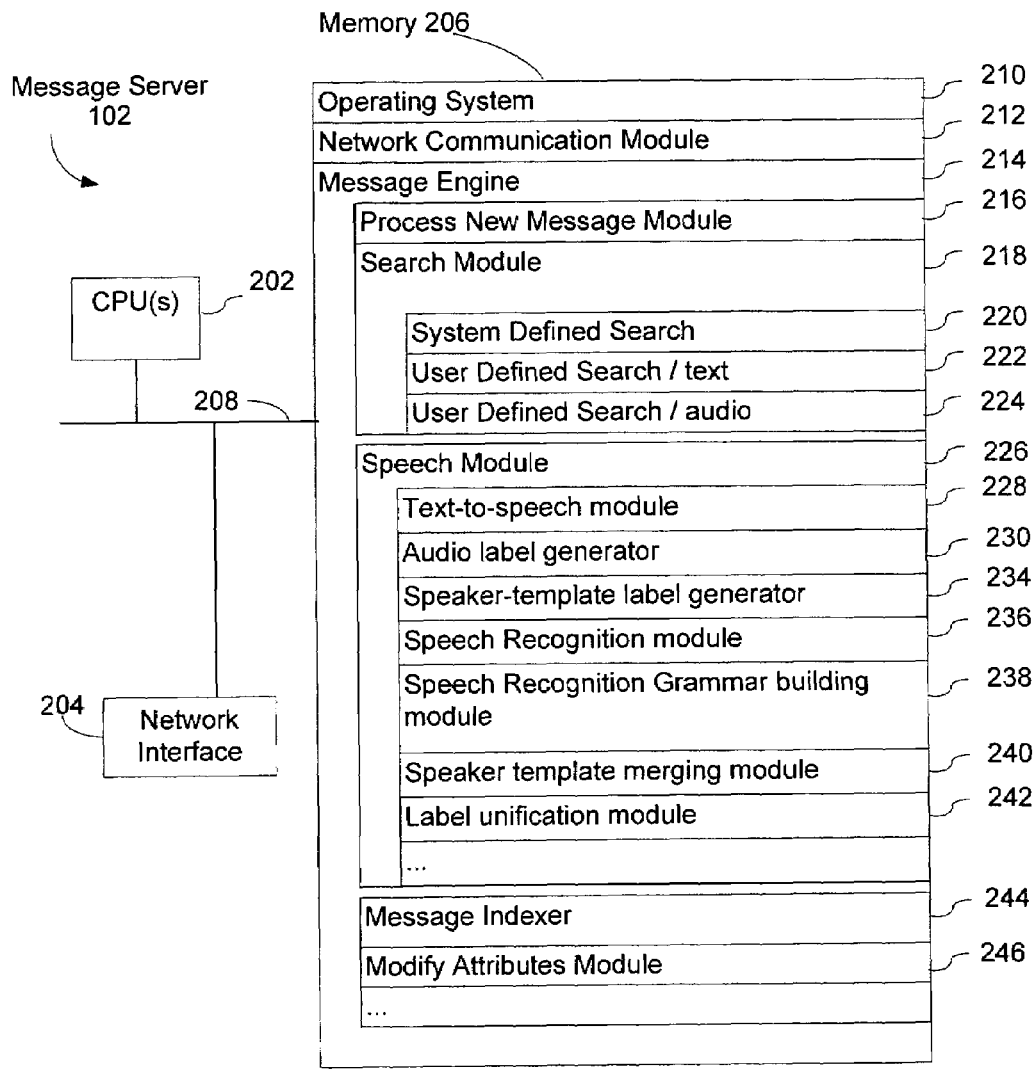
FIG. 2 is a block diagram illustrating a message server in accordance with one embodiment of the present invention.

FIG. 2 is a block diagram illustrating message server 102 in accordance with one embodiment of the present invention. Server 102 typically includes one or more processing units (CPU's) 202, one or more network or other communications interfaces 204, memory 206, and one or more communication buses 208 for interconnecting these components. Server 102 may optionally include a graphical user interface (not shown), which typically includes a display device, a keyboard, and a mouse or other pointing device. Memory 206 may include high-speed random access memory and may also include non-volatile memory, such as one or more magnetic or optical storage disks. Memory 206 may optionally include mass storage that is remotely located from CPU's 202. Memory 206 may store the following programs, modules and data structures, or a subset or superset thereof:

- Operating System 210 that includes procedures for handling various basic system services and for performing hardware dependent tasks;
- Network Communication Module (or instructions) 212 that is used for connecting Server 102 to other computers via the one or more communications Network Interfaces 204 (wired or wireless) and one or more communications networks 106 (FIG. 1), such as the Internet, other wide area networks, local area networks, metropolitan area networks, and so on; and
- Message Engine 214 module for responding to requests from, and providing responses to Clients 104.

The Message Engine 214 may include the following programs, modules and data structures, or a subset or superset thereof:

- Process New Message Module 216 for processing new messages;
- Search Module 218 for searching a user's messages, the Search Module 218 including a module (or instructions) for processing system defined searches 220 (e.g., searches for messages in a user's "inbox", or for "archived messages"), a module (or instructions) for processing search requests from text input supplied by the user 222 and a module (or instructions) for processing search requests from audio input supplied by the user 224;
- Speech Module 226 for performing speech-related tasks, the Speech Module 226 including a module for text-to-speech synthesis 228, an audio label generator 230, a speaker template label generator 234, a speech recognition module 236, a module for building a speech recognition grammar 238, a module for merging speaker templates 240, and a module for unifying verbal labels and text labels 242;
- Message Indexer 244 for indexing the terms and attributes of messages and building or adding to a full text message index 510 (FIG. 5); and
- Modify Attributes Module 246 for modifying the attributes of conversations and messages; the modify attributes module 246 may comprise part of the message indexer 244.

Each of the above identified modules and applications corresponds to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above.

Although FIG. 2 shows server 102 as a number of discrete items, FIG. 2 is intended more as a functional description of the various features which may be present in server 102 rather than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers in server 102 and how features are allocated among them will vary from one implementation to another, and may depend in part on the amount of data traffic that the system must handle during peak usage periods as well as during average usage periods.

Figure 3A:
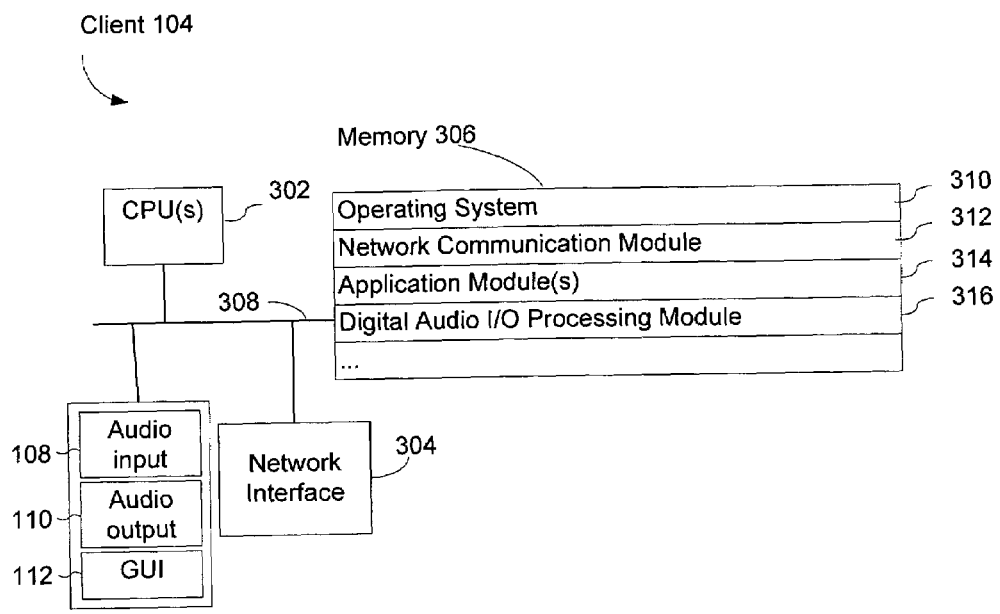
FIG. 3 is a block diagram illustrating two exemplary clients.

FIG. 3 is a block diagram illustrating two exemplary clients 104. As noted above, Client 104 includes audio input mechanism 108 (e.g., a microphone) and audio output mechanism 110 (e.g., a speaker). Client 104 may optionally include a graphical user interface 112, such as a display device, a keyboard, and a mouse or other pointing device. Client 104 typically includes one or more processing units (CPU's) 302, one or more network or other communications interfaces 304, memory 306, and one or more communication buses 308 for interconnecting these components. Memory 306 may include high-speed random access memory and may also include non-volatile memory, such as one or more magnetic or optical storage disks. Memory 306 may store the following programs, modules and data structures, or a subset or superset thereof:

- Operating System 310 that includes procedures for handling various basic system services and for performing hardware dependent tasks;
- Network Communication Module (or instructions) 312 that is used for connecting Client 104 to other computers via the one or more communications Network Interfaces 304 (wired or wireless) and one or more communication networks 106 (FIG. 1), such as the Internet, other wide area networks, local area networks, metropolitan area networks, and so on;
- Applications Module(s) 314, for enabling the Client 104 to perform various applications;
- Digital Audio I/O Processing Module (or instructions) 316 for managing audio input 108 and audio output 110; and
- Client Assistant 318, which handles message formatting and/or management tasks, at least some of which could also be handled by Message Engine 214.

Figure 3B:
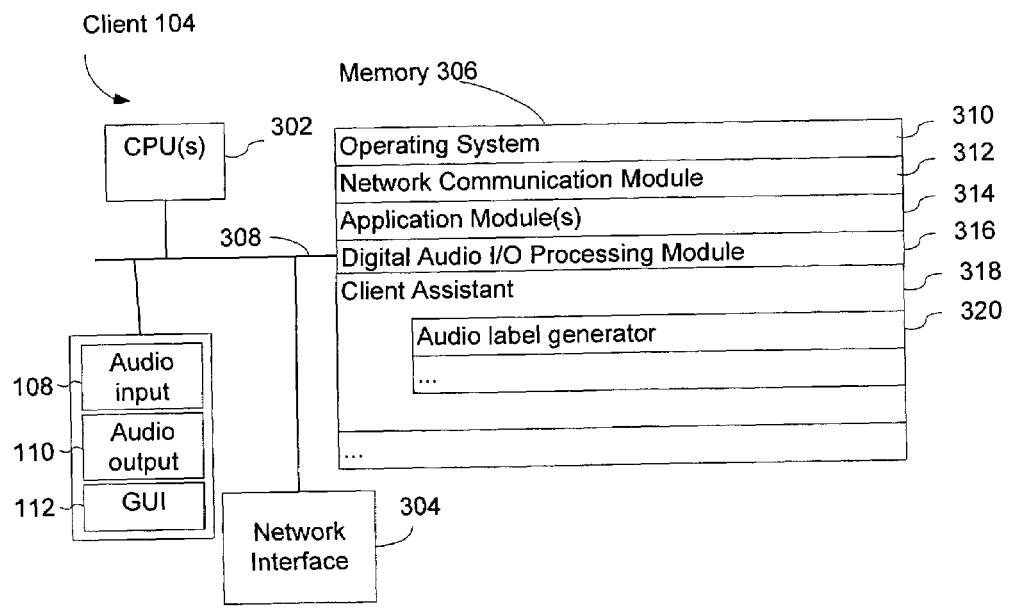

As illustrated schematically in FIG. 3B, Client 104 can incorporate modules, applications, and instructions for performing a variety of message related processing tasks (e.g., audio label generation 320), at least some of which could be handled by Message Engine 214 in Server 102 instead. Alternatively, in some embodiments, client 104 can contain less functionality than shown in FIG. 3A. For example, client 104 could just be a wireline phone with audio input and audio output capabilities.

Figure 4:
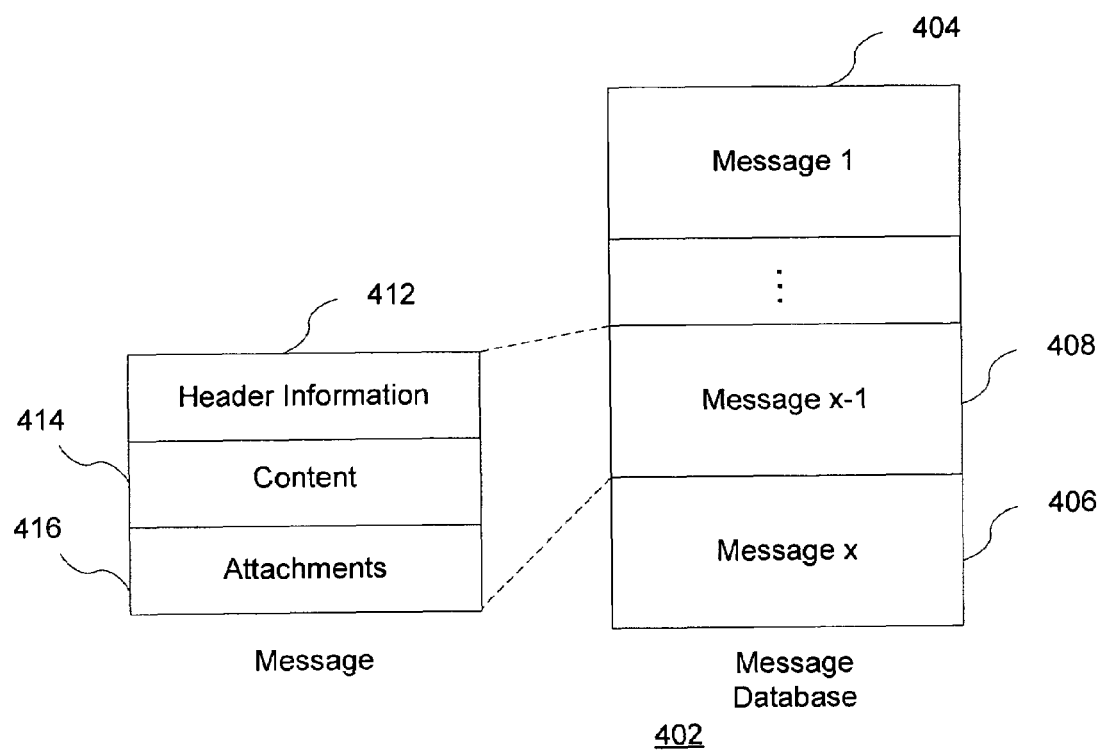
FIG. 4 is a block diagram illustrating an exemplary message database according to one embodiment of the invention.

FIG. 4 is a block diagram illustrating an exemplary message database according to one embodiment of the invention. A Message Database 402 may store information about the messages, for example Message 1 (404) through Message x (406), where x represents the number of messages corresponding to a particular user. In one embodiment, each user's messages are stored in a Message Database 402 unique to that user. In another embodiment, messages belonging to more than one user may be stored in the same Message Database 402. One of ordinary skill in the art would recognize many ways to prevent messages from one user showing up as messages belong to another. In still another embodiment, messages from more than one user may be stored in a Message Database 402, with only one storage entry per message such that multiple users would reference a single copy of a message.

In one embodiment, a Message (e.g., Message 408) may include Header Information 412, Content 414, and Attachments 416. Header Information 414 may include the header information of the message including, for example, information identifying the sender and recipients, a time/date value of the message, and the subject. Other information might also be included in the Header Information such as that described in RFC 2822. The Content 414 may contain the content of the message. The Content 414 may include text and/or other types of content (e.g., images or pictures). Attachment 416 may be the contents of any information attached to a particular message. For example, a document, image, video, or other file attached to a message might be located in this part of Message 410. Those of ordinary skill in the art would recognize other ways to store the message information. For example, an attachment might be stored in another storage structure and a reference to it located in Attachments 416.

Figure 5A:
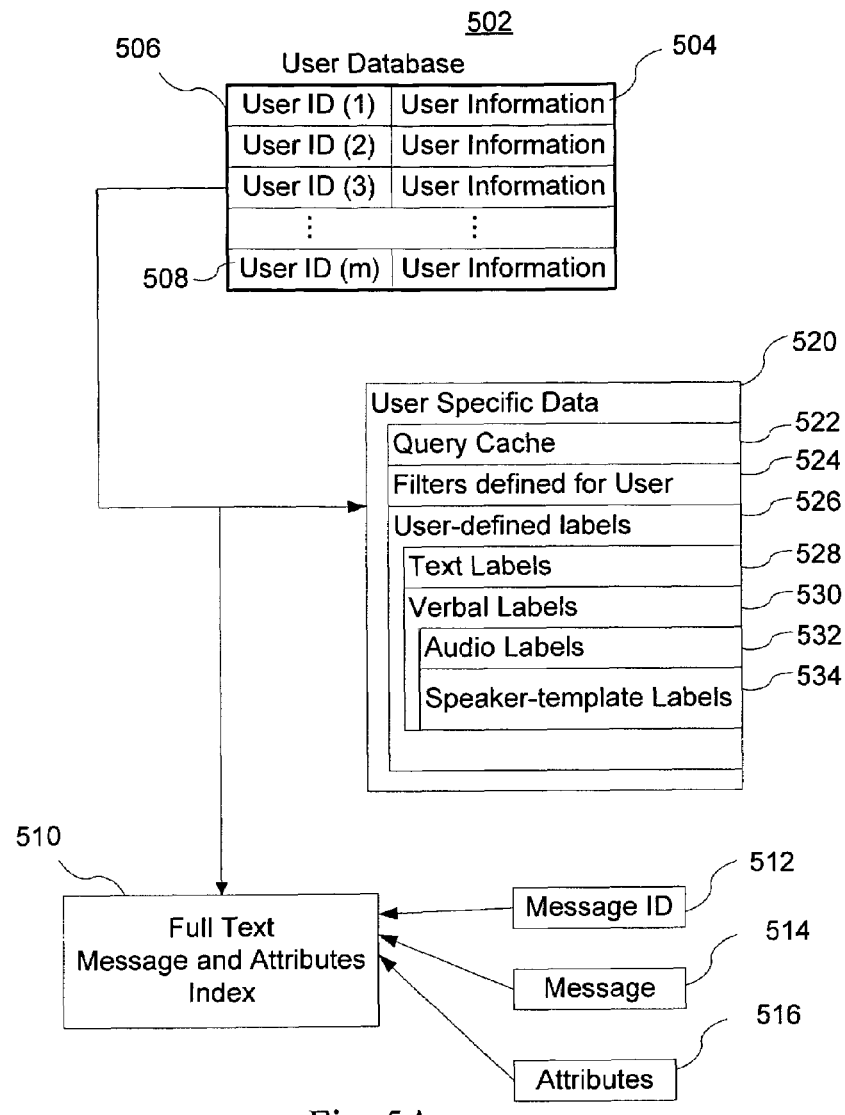
FIGS. 5A, 5B and 5C are block diagrams illustrating an exemplary user database and an index for a particular user according to one embodiment of the invention.

FIG. 5A is a block diagram illustrating an exemplary user database and an index for a particular user according to one embodiment of the invention. A User Database 502 may store information about users. The information stored for a particular user may include User Information 504. User Information 504 may contain various types of user information relating to user preferences, security information, or any other information that might be used by the various embodiments of the invention. The User Database may include user identification information used to identify the users such as User ID (1) (506) to User ID (m) (508) where m might represent the number of users of the system. A particular User ID (m) (508) might be a unique identifier for each user such as an n-bit binary number. Other types of user identification might also be used.

In some embodiments, the User ID of a user is used to identify a set of data structures 520 for storing information about the filters, queries and labels associated with a user's account. In some embodiments, these data structures include a query cache 522 for storing information representing the last few queries submitted by the user; a set of filter data structures 524 for storing user-defined filters, if any; and a labels data structure 526 for storing information representing user-defined labels. The stored information concerning user-defined labels may be presented to the user either visually or aurally to enable the user to easily request messages bearing a user-selected label. The user-defined labels 526 may include text labels 528 and/or verbal labels 530.

As used herein, a "text label" 528 is a label containing text characters that is associated with one or more electronic messages. Text label 528 may be created in a variety of ways. For example, a user can type in text label 528 at client 104 and then server 102 associates text label 528 with one or more messages. Alternatively, a user can speak into a microphone, speech recognition module 236 in server 102 matches the user's verbal input to a text grammar, and then server 102 associates the matched text with one or more messages. Processes and data structures for associating labels with messages, and for identifying messages associated with a specified label are discussed below.

As used herein, a "verbal label" 530 is a label containing audio data that is associated with one or more electronic messages. In some embodiments, verbal label 530 is an audio label 532 that contains digital audio data that is associated with one or more electronic messages. The digital audio data may be stored in a digital audio file, which may be stored in volatile or non-volatile storage. A "digital audio file" as used herein includes any data structure for temporarily or durably storing digital audio data. Audio label 532 may be created when a user speaks into a microphone 108. Either client 104 or server 102 creates a digital audio file of at least some of the user's spoken words, and server 102 associates a verbal label containing the digital audio file with one or more electronic messages. In some embodiments, verbal label 530 is a speaker-template label 534 that contains a speaker template of a specific verbal input from a speaker that is associated with one or more electronic messages. Speaker-template label 534 may be created from a digital audio file. The speaker-template label 534 may be generated by the server 102 at any time after the generation of the digital audio file, such as times when the server has sufficient resources available to perform this task. An example of a speaker template is that which is created by the 'Speaker-Trained Model' capability of the Nuance speech recognition system. Other commercial speech recognition systems have similar capabilities. Speaker templates and other speech recognition technologies are well-known to those of ordinary skill in the art and need not be discussed in detail here.

Figure 5B:
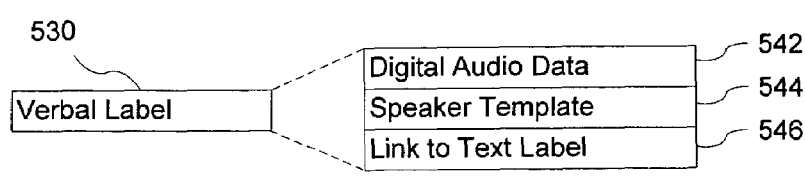
Figure 5C:
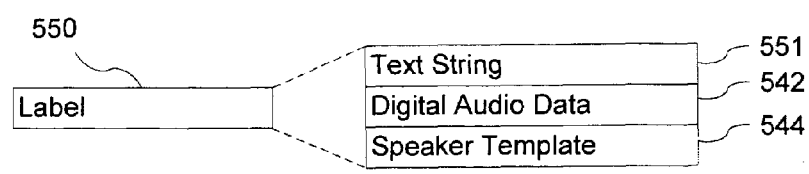

In some embodiments, as shown in FIG. 5B, a verbal label 530 comprises a data structure that includes one or more of the following: digital audio data 542, a speaker template 544, and a link 546 to a text label corresponding to the verbal label 530. In another embodiment, shown in FIG. 5C, a unified data structure 550 is provided for all user-defined labels. This data structure, depending on the particular label, includes one or more of the following: a text string 551 (e.g., the text of a text label), digital audio data 542, and a speaker template 544. In this embodiment, when a label is first generated it may have just a text string 551, or just digital audio data 542, or perhaps even just a speaker template 544. After further processing, however, the label may have two or more of these fields. For purposes of this discussion, any label that includes digital audio data and/or a speaker template may be considered to be a verbal label. In some embodiments, every user-defined label may furthermore have an associated label identifier, which in some embodiments may not be explicitly stored within the label data structure, but instead may be implied from the label's position or location within the set of user-defined labels for a particular user.

The User ID of a user may be used to identify a Full Text and Attributes Index 510 corresponding to the user. A Full Text and Attributes Index 510 might be associated with a particular user such that a different user cannot search the index for the messages associated with the particular user. The Full Text and Attributes Index 510 stores information about messages in the user's mail account such that a query applied against the Full Text and Attributes Index 510 returns a list of matching messages (if any). The list might be returned as a list of message identifiers.

The information included in the Full Text and Attributes Index 510 for a particular message may include the message's Message ID 512, the content 514 of the message, and information about the attributes 516 of the message (e.g., text labels 528 and/or verbal labels 530 associated with the message). The messages associated with each distinct user-defined label may be represented in the Index 510 in any of a number of ways. For instance, the Index 510 may include a list of messages associated with each distinct user-defined label. The Message ID 512 is a unique identifier for the message (i.e., unique with respect to all other messages stored for the same user). In some embodiments, the Message ID 512 is an n-bit number that is used to reference a particular message stored in the Message Database 402. In one embodiment, the Message ID 512 may be a 64-bit number. The Message ID 512 may be composed of timestamp information and information relating to the content of the message to which the Message ID 512 refers. The timestamp information may be a Y-bit (e.g., 32-bit or 48-bit) timestamp provided by the system indicating when a message is received by, for example, an SMTP Gateway. The information relating to the content of the message may be 64-Y bit hash of the message contents.

In some embodiments, the contents of a message and/or the subject of a message are placed into the index as fully indexed and searchable terms. When the index 510 is searched for a term or combination of terms, the index returns a list of messages (e.g., message IDs) that match the term or combination of terms. Certain predefined conditions may dictate a return of less than all of the matching messages. In another embodiment, the index 510 returns a list of conversations (conversation IDs) that match the term or combination of terms in a query, where each conversation is a group of messages.

In one embodiment, the entries for the search terms in the Full Text and Attributes Index 510 are ordered in accordance with the timestamp information included in the Message ID 512 of each indexed message, such that the most recent messages matching the search terms are preferentially returned. For instance, the list of Message IDs of messages corresponding to each term in the index 510 may be ordered such that Message IDs having the most recent timestamps are listed earlier in the list than Message IDs having older timestamps. In other embodiments, date/time information associated with each message indicates the date and/or time of receipt of each message, but the date/time information is not embedded in the Message IDs. In such embodiments, the entries in the index 510 are nevertheless arranged so that the Message IDs of messages having the most recent date/time values are listed earlier in the list than Message IDs having older date/time values. In other embodiments, other criteria may be applied to determine the ordering of messages. For example, they may be ordered by a measure of quality of match to search terms, such as the frequency of occurrence of a search term in the body of a message.

At least some of the attributes 516 (e.g., labels) associated with a message are also indexed (i.e., included in the index 510). Attributes 516 are added to the Full Text and Attributes Index 510 such that a query on a particular attribute returns those messages matching that particular attribute. When a label or other attribute is added to or removed from a conversation, the index 510 is updated accordingly. The index includes entries or data that map each defined label or attribute to all the messages (or, in other embodiments, conversations) bearing that label or attribute. Thus, when a label is added to a conversation, data is added to the index 510 to map that label to all the messages in the conversation. When a label is removed from a conversation, the data in the index that maps the label to the messages in the conversation is removed or invalidated.

Figure 6:
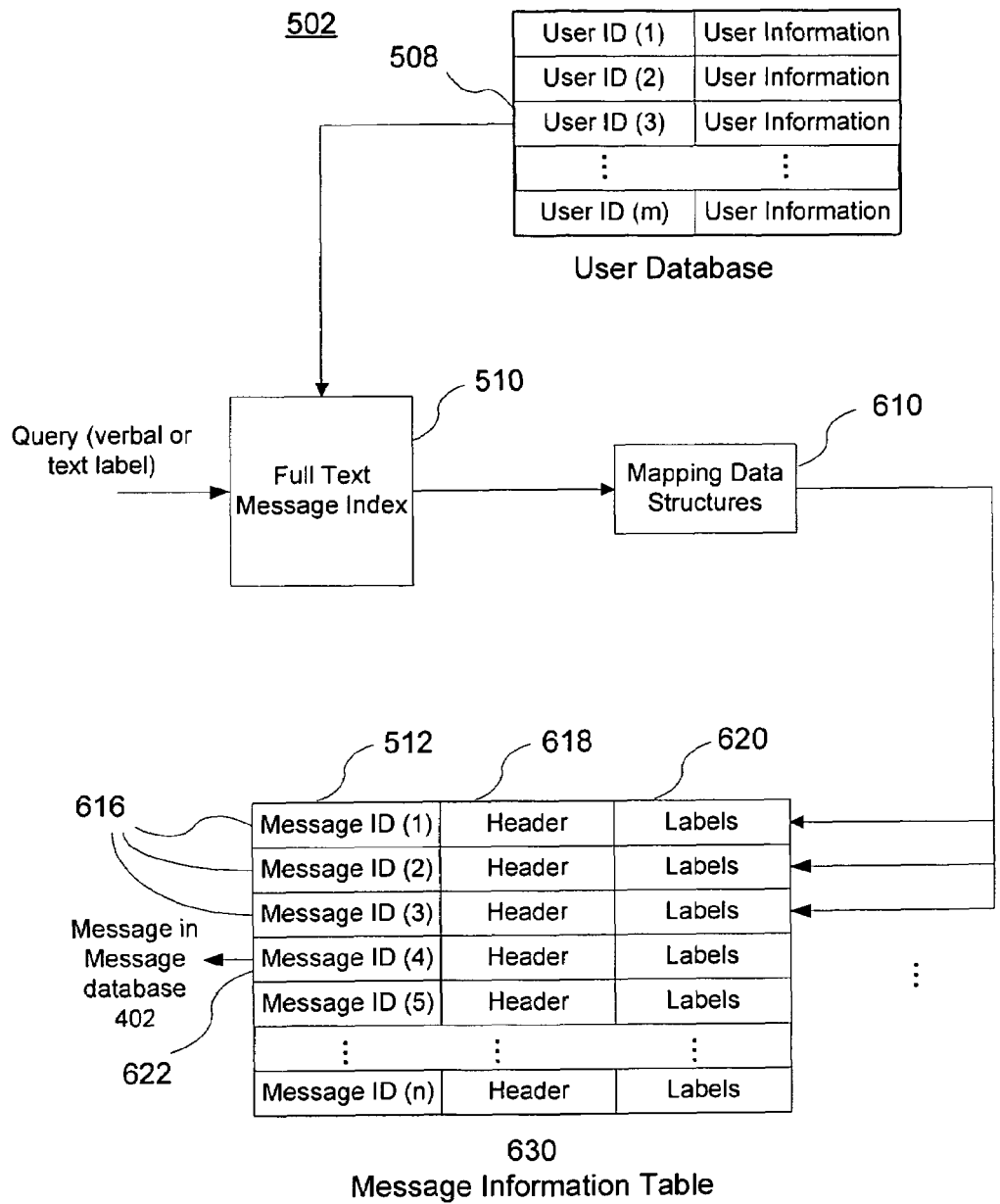
FIG. 6 is a block diagram illustrating an exemplary set of data structures used for determining attributes to be associated with messages according to one embodiment of the invention.

FIG. 6 is a block diagram illustrating an exemplary set of data structures used for determining the attributes associated with a message, and for locating a user's messages having one or more attributes associated therewith according to one embodiment of the invention. As described earlier, User Database 502 may contain a User ID 508 that references the Full Text and Attributes Index 510 associated with a particular user. Mapping data structures 610 are used to associate a particular Message ID 512 with a particular message in a message entry 616 in a message information table 630. An exemplary message entry 616 includes the Message ID 512, Header 618, and a list of Labels 620 associated with a particular message. The Header 618 may contain all or a portion of the Header Information 412 described earlier. The list of Labels 620 may contain information identifying certain attributes associated with the message. In some embodiments, the list of Labels 620 in a particular message entry 616 identifies or includes pointers to or the label identifiers for verbal labels 530 and text labels 528 for a particular message. The Message ID (4) 512 of a particular entry 622 may be associated with a particular message in the Message Database 402. In some embodiments, the message entry 616 does not include the content of the body of the corresponding message. In other embodiments, attributes may be associated with groups of messages (e.g., conversations).

FIGS. 7-10 show processes performed by message server 102. It will be appreciated by those of ordinary skill in the art that one or more of the acts described may be performed by hardware, software, or a combination thereof, as may be embodied in one or more computing systems. In other embodiments, portions of these processes can be performed by client 104 using components analogous to those shown for server 102 in FIG. 2.

Figure 7:
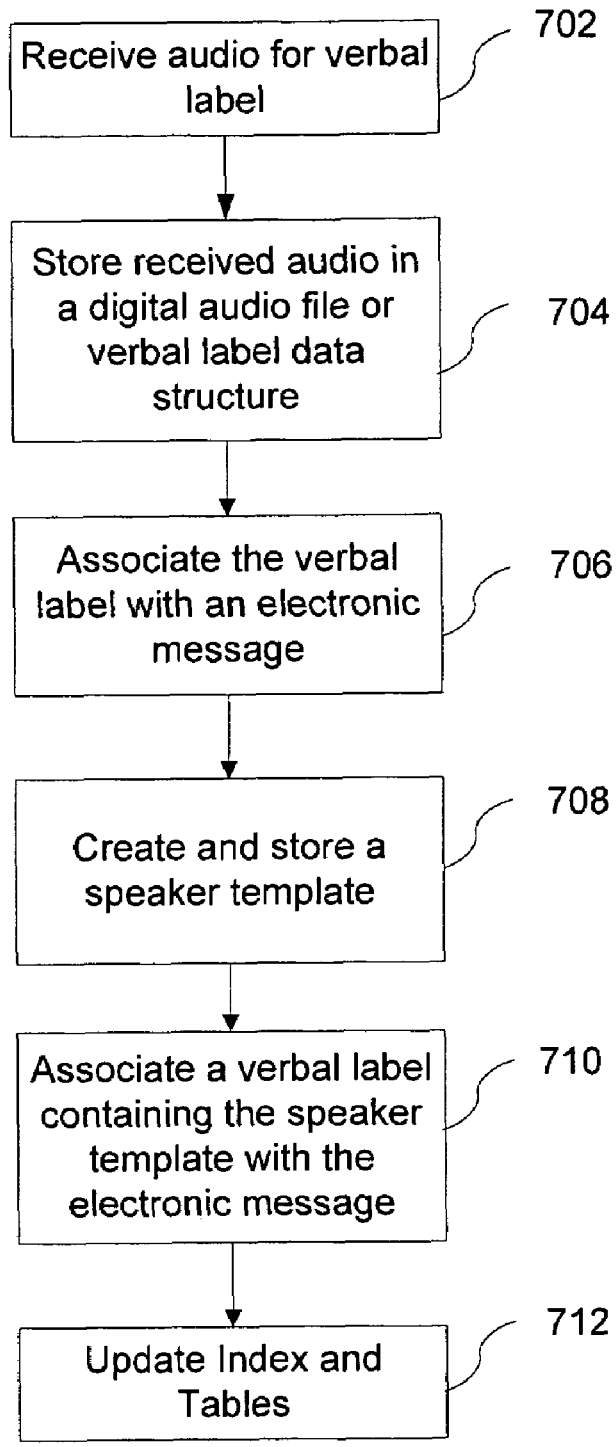
FIG. 7 is a flowchart representing a method of adding a verbal label to an electronic message according to one embodiment.

FIG. 7 is a flowchart representing a method of adding a verbal label to an electronic message according to one embodiment. In some embodiments, the electronic message is an e-mail message.

In some embodiments, a user listening to e-mail messages with client 104 (e.g., listening to words generated by text-to-speech module 228 and sent by network communication module 212 to client 104) sends a request (e.g., a verbal request or keyboard entered command) to message server 102 to add a verbal label to one or more messages. Server 102 receives the request and, assuming the request was a verbal request, speech recognition module 236 interprets the request. Server 102 sends a request back to client 104 that the user input the audio for the verbal label. The user speaks the audio for the verbal label into microphone 108 and client 104 transmits the audio to server 102 using network communication module 312.

Audio label generator 230 receives the audio for the verbal label (702) and stores the received audio in a digital audio file or in a verbal label data structure (704). The resulting verbal label 530 (which may also be called an audio label 532) is stored in the user specific data 520 in user database 502.

Audio label generator 230 associates the verbal label with an electronic message (706). In some embodiments, verbal label 530 is associated with a message by placing the label 530 or a pointer to (or label identifier of) label 530 in the list of Labels 620 for the corresponding message entry 616. Subsequently, the verbal label 530 may be associated with additional messages.

In some embodiments, speaker-template label generator 234 creates and stores a speaker template of the digital audio file (708). The resulting verbal label 530, which may be called a speaker-template label 534, is stored in the user specific data 520 in user database 502.

Speaker template label generator 234 associates the speaker-template label 534 (i.e., a verbal label containing the speaker template) with one or more electronic messages (710). In some embodiments, speaker-template label 534 is associated with one or more messages by placing the label 534, a pointer to label 534 or a label identifier of label 534 in the list of Labels 620 of the corresponding message entries 616. Subsequently, the speaker-template label 534 may be associated with additional messages, as discussed below.

As noted above with respect to FIG. 5B, in various embodiments, verbal label 530 may comprise: (1) digital audio data with no speaker template of the digital audio data, (2) a speaker template of digital audio data, or (3) both digital audio data and a speaker template of the digital audio data.

An indexer 244, or a modify attributes module (or instructions) 246 updates index 510 and a message entry 616 to identify or point to the new verbal label and the message associated with that verbal label (712).

In some embodiments, steps 708 and 710 are performed by a server as a background task, such as during periods when the server otherwise has a low workload. Alternately, the performance of steps 708 and 710 may be performed with lower priority than steps 704 and 706. In such embodiments, a verbal label containing just audio data is initially associated with a message. That verbal label is upgraded (by adding the speaker template to it) or supplemented with another verbal label when the corresponding speaker template is generated.

In some embodiments, the speaker templates are clustered by speaker template merging module 240 to improve recognition performance when retrieving verbal labels by voice and to save storage space. For clustering, the verbal labels contain both digital audio data and a speaker template of the digital audio data. In clustering, all the verbal labels for a user are compared and those labels that are very similar to each other are assumed to be the same label. Thus, only one of these labels needs to be saved and a single verbal label can be associated with multiple electronic messages. Comparison of all verbal labels will take $O(N^2)$ comparisons, where N is the number of verbal labels. For each verbal label, speech recognition of all the other audio labels is run against the speaker template for the label in question and the recognition confidence (i.e., quality of match) is determined. In some embodiments, for each pair of verbal labels, A and B, their closeness is computed as the average of the two measured confidences (i.e., the confidence when recognizing the audio for A against the speaker template for B and when recognizing the audio for B against the speaker template for A). Then, well-known mathematical averaging and statistical clustering techniques can be used to combine similar labels. A new speaker template is created for the cluster that is a combination of the speaker templates being combined into that cluster. Clustering can be done as a background task.

Figure 8:
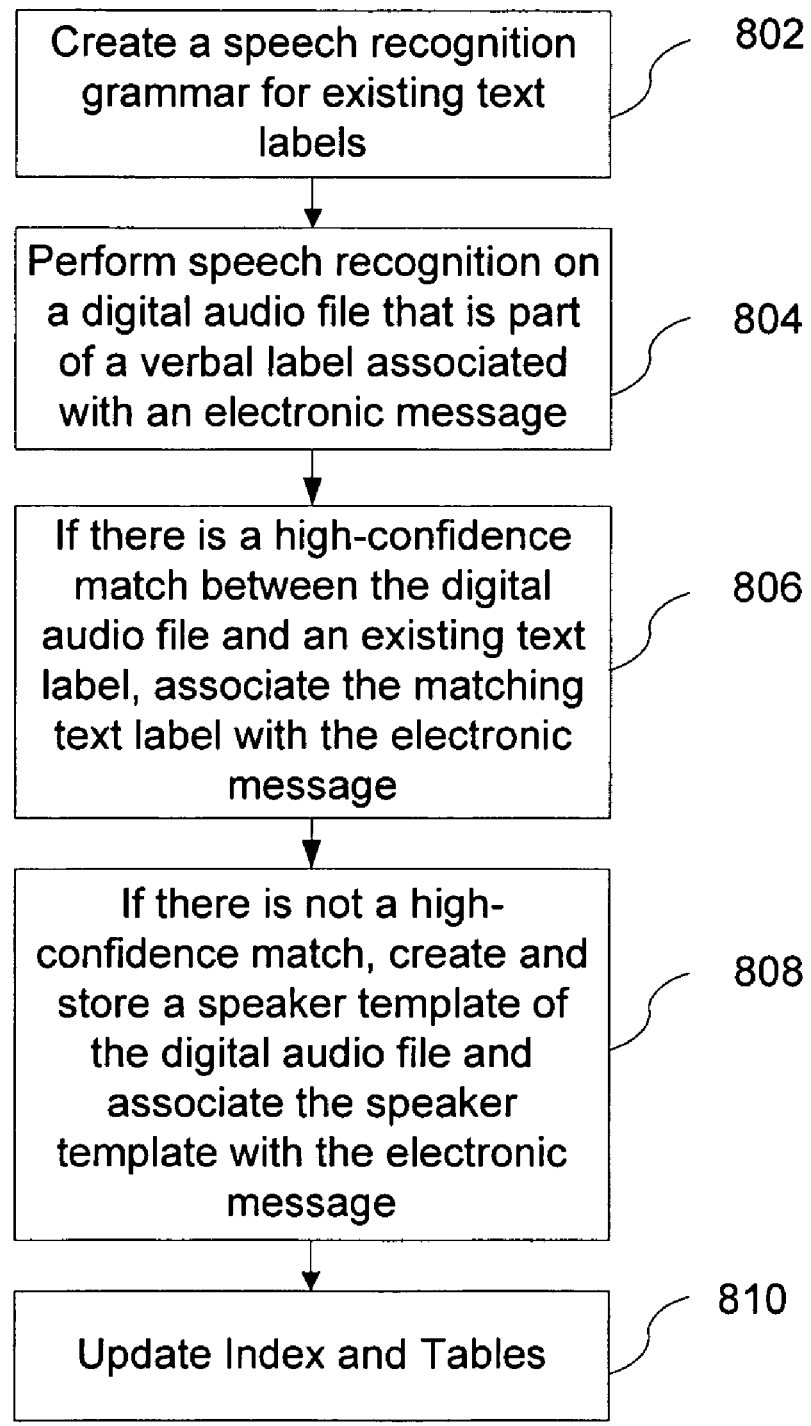
FIG. 8 is a flowchart representing a method of unifying a verbal label and a text label according to one embodiment.

FIG. 8 is a flowchart representing a method of unifying a verbal label and a text label according to one embodiment.

Speech recognition grammar building module 238 creates a speech recognition grammar for existing text labels 528 for a user (802). To create the grammar, a commercial speech recognition system can either find a model in an internal dictionary for each word in each text label, or it may create such a model automatically (e.g., with Nuance's autopronunciation capability). In either case, the models for each text label are linked up in parallel to create a speech recognition grammar capable of recognizing any one of the text labels.

Speech recognition module 236 performs speech recognition on a digital audio file that is part of a verbal label associated with an electronic message (804). Alternatively, speech recognition can be performed on input speech when the user initially speaks their label. If there is a high-confidence match between the digital audio file and an existing text label 528, label unification module 242 associates the matching text label 528 with the one or more messages associated with the verbal label (806). In some embodiments, the verbal label 530 is deleted after a matching text label 528 is identified. In some embodiments, both the verbal label 530 and a matching text label 528 remain associated with one or more messages via the lists of Labels 620 in message entries 616.

If there is not a high-confidence match between the digital audio file and an existing text label 528, speaker-template label generator 234 creates and stores a speaker template of the digital audio file (808). Speaker-template label 534 is stored in the user specific data 520 in user database 502. Speaker-template label generator 234 also associates the speaker template with one or more electronic messages (808).

Message Indexer 244 (FIG. 2) or Modify Attributes Module 246 updates index 510 and message information table 630 to show the new association between matching text label 528 and the electronic message or between the speaker-template label and the electronic message. (810). In some embodiments, a speaker template of a verbal label's digital audio file is generated independent of the label unification process shown in FIG. 8, and thus step 808 is not performed as part of the label unification process in such embodiments.

Figure 9:
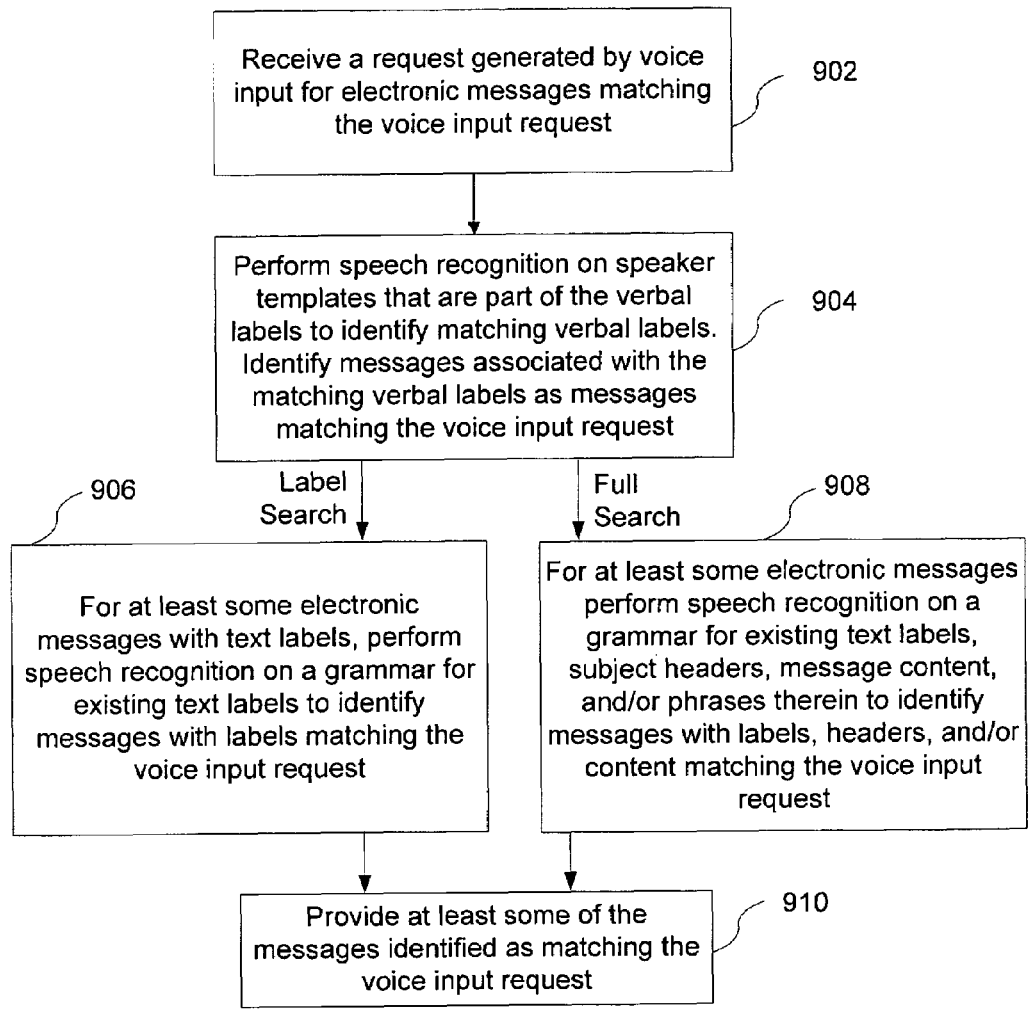
FIG. 9 is a flowchart representing a method of retrieving messages using verbal input according to one embodiment.

FIG. 9 is a flowchart representing a method of retrieving messages using verbal input according to one embodiment.

The search module 218 of the message server 102 (FIG. 2) receives a request generated by voice input for electronic messages matching the voice input request (902). Some requests can ask for messages with a specified label ("Label Search"). Other requests can ask for messages where any part of the message (e.g., labels, headers, and/or content) matches the voice input request ("Full Search").

For at least some electronic messages with verbal labels 530, search module 218 in conjunction with speech recognition module 236 performs speech recognition on the individual speaker templates in, or associated with, the user's set of verbal labels (e.g., speaker-template labels 534). If one or more such verbal labels are identified as matching the voice input request, the messages associated with the one or more matching verbal labels are identified as messages matching the voice input request (904). In other embodiments, all speech templates can be combined in a single grammar, and speech recognition runs in N-best mode. All labels in the N-best list with high confidence would be returned.

In some embodiments, speech recognition module 236 also performs speech recognition on a background ("garbage") model. For instance, the speech recognition grammar can include one or more speaker templates in parallel with a background ("garbage") model. Speech recognition module 236 identifies messages with speaker-template labels 534, if any, that more closely correspond to the voice input request as compared to the correspondence between a garbage model and the voice input request. The identification may also depend on a confidence threshold. Various approaches to background or garbage modeling can be used, which are well known to those of ordinary skill in the art of speech recognition. For example, a loop consisting of all context-independent phonetic models can be used.

In a Label Search, for at least some electronic messages with text labels, search module 218 in conjunction with speech recognition module 236 also performs speech recognition on a grammar for the user's set of text labels to identify any text labels matching the input voice request. The messages associated with the identified text labels are then added to the set of messages identified as matching the input voice request. (906). In another embodiment, for a Label Search, steps 904 and 906 are combined and reorganized into a first step for identifying all labels (in the user's set of labels) that match the input voice request, and a second step for identifying messages associated with the identified labels.

When matching text labels, if there is a desire to maximize recall (i.e., to make sure no message is missed, even if that causes some messages to be retrieved that are not desired), then recognition of the text label grammar can be run in an "N-best mode" in some embodiments. In this mode, speech recognition module 236 attempts to return N messages with the best matching text labels, rather than just messages with the single best matching text label, provided the "matching" text labels of the N identified messages are also above a threshold level of confidence. Speech recognition module 236 tries to return N results, but it may return either fewer or more than N depending on the situation. For example, it may return fewer if there are fewer possible results, or fewer with confidence scores above a threshold level of confidence. It may return more if a number have the same or substantially the same confidence scores above a threshold level of confidence.

In a Full Search, search module 218 in conjunction with speech recognition module 236 performs speech recognition on a grammar for existing text labels, subject headers, message content, and/or phrases therein to identify messages with labels, headers, and/or content matching the input voice request (908). In some embodiments, a Full Search may be restricted to a subset of the user's messages. For instance, the subset of messages may exclude messages marked or stored as deleted messages and may also exclude messages marked or stored as "spam" messages. A Label Search may also be limited to a similar subset of messages in the user's message account.

For both a Label Search and a Full Search, search module 218 in conjunction with text-to-speech module 228 and network communication module 212 provides at least some of the messages that match the input voice request to client 104 (910).

Figure 10:
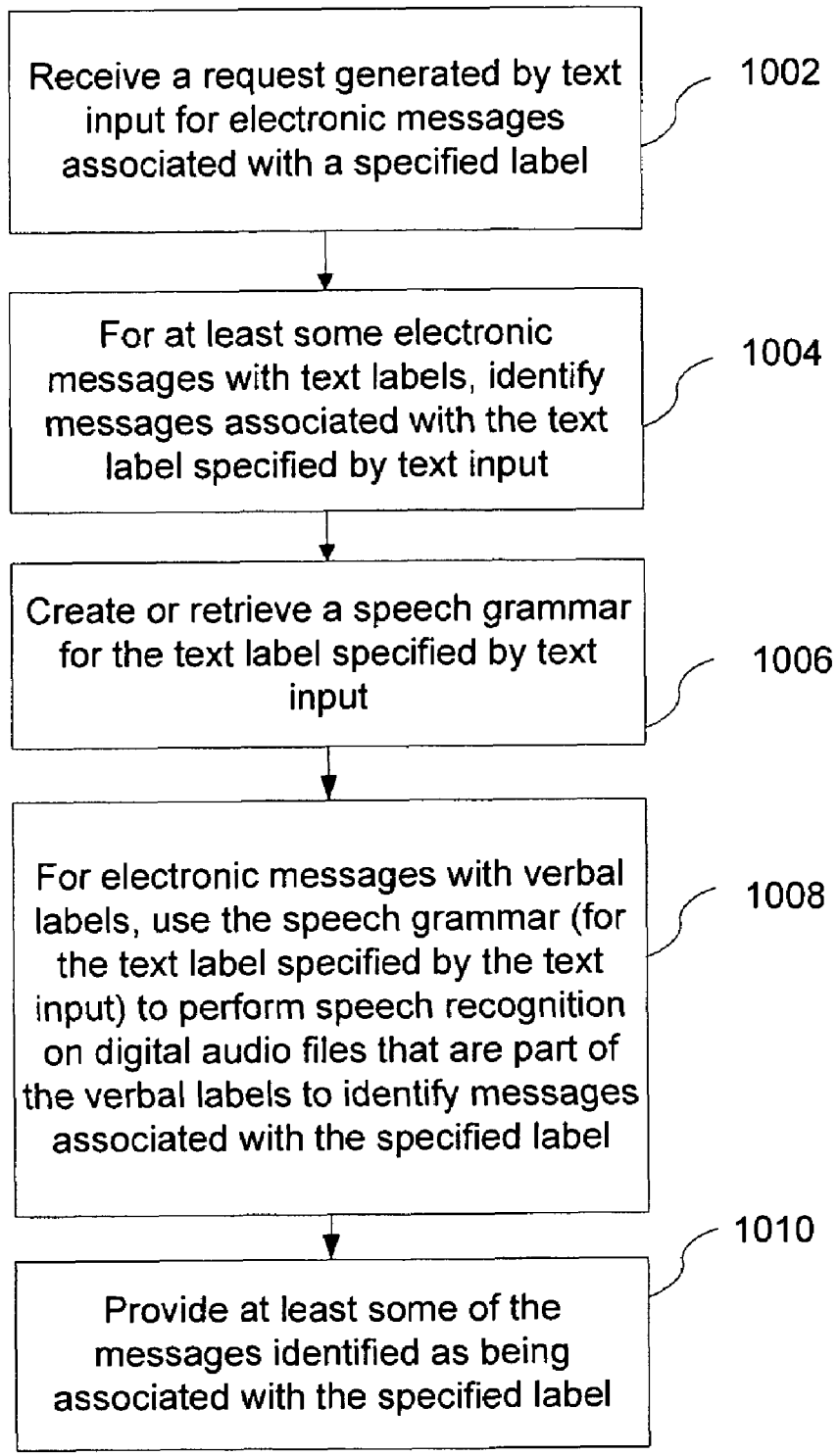
FIG. 10 is a flowchart representing a method of retrieving messages using text input according to one embodiment.

FIG. 10 is a flowchart representing a method of retrieving messages using text input according to one embodiment.

Search module 218 receives a request generated by text input for electronic messages associated with a specified label (1002).

Search module 218 identifies messages associated with the text label specified by the text input (1004).

Search module 218 in conjunction with speech recognition grammar building module 238 creates or retrieves a speech grammar for the text label specified by text input (1006).

For labels that are verbal labels 530 but not text labels 528, search module 218 in conjunction with speech recognition module 236 uses the speech grammar (for the text label specified by the text input) to perform speech recognition on digital audio files that are part of the verbal labels 530 to identify verbal labels that match the specified text label. Messages associated with the identified verbal labels are then identified (1008). In some embodiments, operations 1004 and 1008 are combined and reorganized into a first step for identifying all labels (in the user's set of labels) that match the specified text label, and a second step for identifying messages associated with the identified labels.

In some embodiments, speech recognition module 236 performs speech recognition on a grammar consisting of the input text grammar (i.e., the grammar created in 1006, FIG. 10) in parallel with a background ("garbage") model. Speech recognition module 236 identifies digital audio files (that are part of verbal labels) 534 that more closely correspond to the branch of the grammar containing the text grammar than the garbage model. The identification may also depend on a confidence threshold. Various approaches to background or garbage modeling can be used. For example, a loop consisting of all context-independent phonetic models can be used.

Search module 218 in conjunction with text-to-speech module 228 and network communication module 212 provides at least some of the messages identified as being associated with the specified text label to client 104 (1010).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
    receiving an audio input from a user;
    creating a verbal label comprising a digital audio file including audio data representing the audio input from the user and a speaker template of the digital audio file;
    labeling an e-mail message using the verbal label, wherein the verbal label is used to identify the email message; and
    unifying the verbal label with a preexisting text label for the user, wherein the unifying includes:
        performing speech recognition on the audio input from the user or the audio data representing the audio input from the user,
        matching the preexisting text label for the user to the audio input from the user or the audio data representing the audio input from the user, and
        labeling the e-mail message with the matching preexisting text label for the user.

2. The method of claim 1, wherein the verbal label comprises a link to a text label associated with the plurality of electronic messages.

3. A computer-implemented method, comprising:
    receiving an audio input from a user;
    creating a verbal label comprising audio data representing the audio input from the user;
    labeling a plurality of electronic messages using the verbal label, wherein the verbal label is used to identify the plurality of electronic messages; and
    unifying the verbal label with a preexisting text label for the user, wherein the unifying includes:
        performing speech recognition on the audio input from the user or the audio data representing the audio input from the user,
        matching the preexisting text label for the user to the audio input from the user or the audio data representing the audio input from the user, and
        labeling the plurality of electronic messages with the matching preexisting text label for the user.

4. The method of claim 3, wherein the electronic messages are e-mail messages.

5. The method of claim 3, wherein the verbal label comprises digital audio data.

6. The method of claim 3, wherein the verbal label comprises a speaker template of digital audio data representing the audio input from the user.

7. The method of claim 3, wherein the verbal label comprises digital audio data representing the audio input from the user and a speaker template of the digital audio data.

8. A computer-implemented method, comprising:
    receiving a request for electronic messages associated with a specified label; and
    identifying electronic messages labeled using the specified label, including electronic messages having an associated verbal label corresponding to the specified label,
    wherein the verbal label comprises audio data representing audio input by a user,
    wherein the verbal label is used to identify the electronic messages and wherein the verbal label is unified with a preexisting text label for the user, wherein unifying the verbal label with the preexisting text label includes:

performing speech recognition on the audio input by the user or the audio data representing the audio input from the user,
matching the preexisting text label for the user to the audio input from the user or the audio data representing the audio input from the user, and
labeling the electronic messages having the associated verbal label with the matching preexisting text label for the user.

9. The method of claim 8, wherein the request is generated by voice input.

10. The method of claim 8, wherein the request is generated by text input.

11. The method of claim 8, wherein at least one of the identified messages associated with the specified label has the same label as the specified label.

12. The method of claim 8, wherein at least one of the identified messages associated with the specified label has information in a header that corresponds to the specified label.

13. The method of claim 8, wherein at least one of the identified messages associated with the specified label has content that corresponds to the specified label.

14. The method of claim 8, wherein the identifying includes searching for messages selected from the group comprising messages having the same label as the specified label, messages having information in a header that corresponds to the specified label, and messages having content that corresponds to the specified label.

15. The method of claim 8, wherein text labels in the identified messages are an N-best match to a request input by voice, where N is a number greater than one.

16. The method of claim 8, wherein the request more closely corresponds to a speaker-template label for the identified messages than to a garbage model.

17. A memory containing a data structure, the data structure comprising:
a verbal label used to label a plurality of electronic messages, the verbal label comprising audio data that represents audio input from a user, wherein the verbal label is used to identify the plurality of electronic messages, and wherein the verbal label is unified with a preexisting text label for the user, wherein unifying the verbal label with the preexisting text label includes:
performing speech recognition on the audio input by the user or the audio data representing the audio input from the user,
matching the preexisting text label for the user to the audio input from the user or the audio data representing the audio input from the user, and
labeling the plurality of electronic messages with the matching preexisting text label for the user.

18. A system comprising at least one server, wherein said at least one server is configured to:
receive an audio input from a user;
create a verbal label comprising audio data that represents the audio input from the user;
label a plurality of electronic messages using the verbal label, wherein the verbal label is used to identify the plurality of electronic messages; and
unify the verbal label with a preexisting text label for the user, wherein the unifying includes:
performing speech recognition on the audio input from the user or the audio data representing the audio input from the user,
matching the preexisting text label for the user to the audio input from the user or the audio data representing the audio input from the user, and
labeling the plurality of electronic messages with the matching preexisting text label for the user.

19. A system comprising at least one server, wherein said at least one server is configured to:
receive a request for electronic messages associated with a specified label; and
identify electronic messages labeled using the specified label, including electronic messages labeled using an associated verbal label corresponding to the specified label, wherein the verbal label comprises audio data representing audio input by a user, wherein the verbal label is used to identify the electronic messages and wherein the verbal label is unified with a preexisting text label for the user, wherein unifying the verbal label with the preexisting text label includes:
performing speech recognition on the audio input by the user or the audio data representing the audio input from the user,
matching the preexisting text label for the user to the audio input from the user or the audio data representing the audio input from the user, and
labeling the electronic messages having the associated verbal label with the matching preexisting text label for the user.

20. A machine readable medium having stored thereon data representing sequences of instructions, which when executed by a computer, cause the computer to:
receive an audio input from a user;
create a verbal label comprising audio data that represents the audio input from the user;
label a plurality of electronic messages using the verbal label, wherein the verbal label is used to identify the plurality of electronic messages; and
unify the verbal label with a preexisting text label for the user, wherein the unifying includes:
performing speech recognition on the audio input from the user or the audio data representing the audio input from the user,
matching the preexisting text label for the user to the audio input from the user or the audio data representing the audio input from the user, and
labeling the plurality of electronic messages with the matching preexisting text label for the user.

21. A machine readable medium having stored thereon data representing sequences of instructions, which when executed by a computer, cause the computer to:
receive a request for electronic messages associated with a specified label; and
identify electronic messages labeled using the specified label, including electronic messages labeled using an associated verbal label corresponding to the specified label,
wherein the verbal label comprises audio data representing audio input by a user, wherein the verbal label is used to identify the electronic messages, and wherein the verbal label is unified with a preexisting text label for the user, wherein unifying the verbal label with the preexisting text label includes:
performing speech recognition on the audio input by the user or the audio data representing the audio input from the user,
matching the preexisting text label for the user to the audio input from the user or the audio data representing the audio input from the user, and labeling the electronic messages having the associated verbal label with the matching preexisting text label for the user.

22. A computer-implemented method, comprising:
receiving an audio input from a user;
creating a verbal label comprising digital audio data representing the audio input received from the user;
labeling a plurality of electronic messages using the verbal label, wherein the verbal label is used to identify the plurality of electronic messages;
unifying the verbal label with a preexisting text label for the user, wherein the unifying includes:
- performing speech recognition on the audio input from the user or the audio data representing the audio input from the user,
- matching the preexisting text label for the user to the audio input from the user or the audio data representing the audio input from the user, and
- labeling the plurality of electronic messages with the matching preexisting text label for the user; and retrieving one or more of the plurality of electronic messages using the verbal label.

23. The computer-implemented method of claim 22, wherein the verbal label comprises a speaker template of the digital audio data representing the audio input received from the user.

24. The computer-implemented method of claim 22, wherein retrieving further comprises:
receiving a request for retrieval of electronic messages that are labeled with a specified label;
determining that the verbal label corresponds to the specified label; and
identifying the one or more electronic messages using the verbal label.

25. The computer-implemented method of claim 24, wherein the request is a voice input request, the determining further comprising:
performing speech recognition on speaker templates included in a plurality of verbal labels to identify that the verbal label corresponds to the specified label.

26. A computer-implemented method, comprising:
receiving an audio input from a user for a verbal label;
creating the verbal label comprising a digital audio file including audio data representing the audio input from the user, and a speaker template of the digital audio file;
labeling a plurality of electronic messages using the verbal label, wherein the verbal label is used to identify the plurality of electronic messages; and
unifying the verbal label with a preexisting text label for the user, wherein the unifying includes:
- performing speech recognition on the audio input from the user or the audio data representing the audio input from the user,
- matching the preexisting text label for the user to the audio input from the user or the audio data representing the audio input from the user, and
- labeling the plurality of electronic messages with the matching preexisting text label for the user.

* * * * *

UNITED STATES PATENT AND TRADEMARK OFFICE
CERTIFICATE OF CORRECTION

PATENT NO. : 7,627,638 B1 Page 1 of 1
APPLICATION NO. : 11/019431
DATED : December 1, 2009
INVENTOR(S) : Michael H. Cohen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1195 days.

Signed and Sealed this

Second Day of November, 2010

David J. Kappos
*Director of the United States Patent and Trademark Office*